United States Patent [19]
Burton

[11] Patent Number: 6,007,198
[45] Date of Patent: Dec. 28, 1999

[54] REAR-VIEW MIRROR FOR ATTACHMENT TO EYEGLASSES AND CAP BRIMS

[76] Inventor: Jesse L. Burton, 1606 Simpson Dr., Clarksville, Tenn. 37043

[21] Appl. No.: 09/219,607

[22] Filed: Dec. 23, 1998

[51] Int. Cl.[6] .................................................. G02C 7/14
[52] U.S. Cl. ................................................ 351/50; 351/41
[58] Field of Search .................. 351/50, 41, 158, 351/121

[56] References Cited

U.S. PATENT DOCUMENTS

| | | |
|---|---|---|
| D. 284,462 | 7/1986 | Greenlaw et al. . |
| D. 378,159 | 2/1997 | Mulkey . |
| 1,431,147 | 10/1922 | Borresen . |
| 1,504,344 | 8/1924 | Hennigh . |
| 3,988,058 | 10/1976 | Chaney et al. . |
| 4,349,246 | 9/1982 | Binner . |
| 4,490,012 | 12/1984 | Magiskie . |
| 4,603,944 | 8/1986 | Greenlaw et al. . |
| 4,798,454 | 1/1989 | Hyun . |
| 4,934,806 | 6/1990 | Berke et al. . |
| 4,974,954 | 12/1990 | Muller . |
| 5,005,964 | 4/1991 | Berke et al. .............. 351/50 |
| 5,048,943 | 9/1991 | Allen . |

FOREIGN PATENT DOCUMENTS

| | | |
|---|---|---|
| 2532070 | 2/1984 | France . |
| 1257117 | 12/1971 | United Kingdom . |
| 2104236 | 3/1983 | United Kingdom . |

*Primary Examiner*—Hung Xuan Dang
*Attorney, Agent, or Firm*—Richard C. Litman

[57] ABSTRACT

The mirror attachment for eyeglasses is a lightweight rectangular mirror which is attached to the temple piece of a pair of eyeglasses by a hinged arm. The mirror may be folded to a closed position generally parallel to the temple piece when not in use and extended to a vertical plane parallel to and anterior to the plane of the eyeglass lens when in use. The hinged arm has a proximal portion and a distal portion which are articulated by a knuckle joint hinge. The proximal portion is attached to the temple piece by a hinged joint on a U-shaped clip which is secured to the temple piece by a set screw. The distal portion is attached to the mirror by a hinged joint on a similar U-shaped clip secured to the top of the mirror medially. Alternatively, the mirror attachment may be attached to the brim of a cap or a visor attached to an elastic headband worn under a cap.

19 Claims, 5 Drawing Sheets

REAR-VIEW MIRROR FOR ATTACHMENT TO EYEGLASSES AND CAP BRIMS

BACKGROUND OF THE INVENTION

1. Field of the Invention

The present invention relates to accessories for personal safety and for sporting activities, and particularly to a mirror attachment for use with eyeglasses or for attachment to the bill of a visor or cap which provides the wearer with a view of the area to the rear.

2. Description of the Related Art

On various occasions it may prove useful for a person to be able to view objects and movements to his rear without the necessity of turning around backwards. The ability to see to one's rear without wasted effort is useful in various sports, such as cycling and running, as well as for personal safety, e.g., for pedestrians walking along the side of roadways, or for persons in occupations where there is a risk of being assaulted from behind, such as security guards and night watchmen. A number of different devices have been developed for attachment to spectacles or to the brim of a cap which are designed to provide some degree of rear view vision.

U.S. Pat. No. 1,431,147, issued Oct. 10, 1922 to H. A. Borresen, shows a reflector which may be attached to aviator's goggles or to eyeglasses, the reflector being attached to an arm by a ball and socket (or universal) connector, and the arm being attached to the frame of the goggles or eyeglasses by a second ball and socket connector. U.S. Pat. No. 1,504,344, issued Aug. 12, 1924 to H. K. Hennigh, shows a polished metal reflector attached to the cap of a motorcycle driver by wire.

U.S. Pat. No. 3,988,058, issued Oct. 26, 1976 to Chaney, et al. discloses a rear view mirror for attachment to eyeglasses or a cap by means of a U-shaped support arm having ball and socket joints at both ends of the arm, one for attachment to the mirror, and the other for attachment to the stem of an L-shaped bracket, which, in turn, connects to the frame of the eyeglasses or a cap my means of a pair of prongs which mate with sockets on an elastomeric cushion. U.S. Pat. No. 4,349,246, issued Sep. 14, 1982 to T. S. Binner, shows a rear view mirror attached to a stem by a ball and socket joint, the stem being attached to eyeglasses or a cap by a pair of spring loaded tongues resembling an alligator clip.

U.S. Pat. No. 4,490,012, issued Dec. 25, 1984 to D. M. Magiske, teaches a mirror for attachment to the brim or crown of a hat by means of a mounting base with bifurcated arms secured to the brim by a set screw and a mirror connected to the base by a flexible arm, preferably made from resin insulation filled with solder. U.S. Des. Pat. No. 284,462, issued Jul. 1, 1986, and utility Pat. No. 4,603,944, issued Aug. 5, 1986 to Greenal et. al. show embodiments of a rear view mirror for attachment either to a bicycle crash helmet, or to eyeglasses. The former has a mirror attached to a rod by a ball and socket joint, the rod threading into a clamp against the helmet, the latter having two ball and socket joints and a spring clamp for attachment to eyeglasses.

U.S. Pat. No. 4,798,454, issued Jan. 17, 1989 to K. H. Hyun, teaches a mirror mounted on a rod which telescopes into a channel defined in the ear piece or temple piece of eyeglasses. The rod is spring biased into an extended position and moved by a tab which folds into a recess to lock the rod in a retracted position. U.S. Pat. No. 4,934,806, issued Jun. 19, 1990 to Berke, et al. shows a pair of reflective surfaces joined to a pair of eyeglasses by U-shaped arms, the reflective surfaces being pivotally attached to the arms by a resilient snap fit, and the arms being pivotally attached to the eyeglass frames. The reflective surfaces are viewed through "windows" in the arms.

U.S. Pat. No. 4,974,954, issued Dec. 4, 1990 to G. H. Muller, describes spectacles with rear view vision elements bilaterally which are mounted to arms by a spherical joint, the arms rotating about a horizontal screw. U.S. Pat. No. 5,048,943, issued Sep. 17, 1991 to J. H. Allen, discloses a mirror pivoting around a pin at the end of an arm connected to the temple piece of a pair of eyeglasses by a ball and socket joint. The mirror is rectangular and is stored in a rectangular recess in the temple piece.

U.S. Des. Pat. No. 378,159, issued Feb. 25, 1997 to L. Mulkey, shows a mirror for headgear having an alligator clip attached to a connector by a pivot pin, and a mirror having a short arm mounted to the same connector by a pivot pin. U.K. Patent No. 1,257,117, published Dec. 15, 1971, describes a mirror for physicians which attaches to spectacles including a mirror and three arms connected by two ball and socket joints, the arms being attached to spectacles by a clip.

U.K. Patent No. 2,104,236, published Mar. 2, 1983, shows a mirror attached to an arm, the arm being attached to a clip for attachment to spectacles, the arm having ball and socket joints at both ends. French Patent No. 2,532,070, published Feb. 24, 1984, shows driving mirror spectacles having a support lashed to the temple piece of the spectacles, a "primary axle" extending through the support, a secondary axle hinged to the primary axle, and a mirror.

The majority of such devices rely upon ball and socket joints or upon complicated mechanisms to connect the reflector to the frame of the eyeglasses or to extend the mirror in front of the lens. Consequently they are expensive to manufacture and difficult to adjust. None of the above inventions and patents, taken either singularly or in combination, is seen to describe the instant invention as claimed. Thus a mirror attachment for eyeglasses solving the aforementioned problems is desired.

SUMMARY OF THE INVENTION

The mirror attachment for eyeglasses is a lightweight rectangular mirror which is attached to the temple piece of a pair of eyeglasses by a hinged arm. The mirror may be folded to a closed position generally parallel to the temple piece when not in use and extended to a vertical plane parallel to and anterior to the plane of the eyeglass lens when in use. The hinged arm has a proximal portion and a distal portion which are articulated by a knuckle joint hinge. The proximal portion is attached to the temple piece by a hinged joint on a U-shaped clip which is secured to the temple piece by a set screw. The distal portion is attached to the mirror by a hinged joint on a similar U-shaped clip secured to the top of the mirror medially. Alternatively, the mirror attachment may be attached to the brim of a cap or a visor attached to an elastic headband worn under a cap.

Accordingly, it is a principal object of the invention to provide a mirror attachment for eyeglasses which provides a view of the area to the rear of the user for use in sports or for personal security.

It is another object of the invention to provide a mirror attachment for eyeglasses which employs hinged joints for adjustment between a closed storage position parallel to the temple piece of the eyeglasses and an open position in plane in front of the lenses when in use.

It is a further object of the invention to provide a mirror attachment for eyeglasses which utilizes knuckle joint hinges for ease in use and economy in manufacture.

Still another object of the invention is to provide a mirror attachment which may be attached to the brim of a cap or visor for viewing the area to the rear which folds between an open, extended position during use and a closed storage position by means of an articulated arm with knuckle joint hinges.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
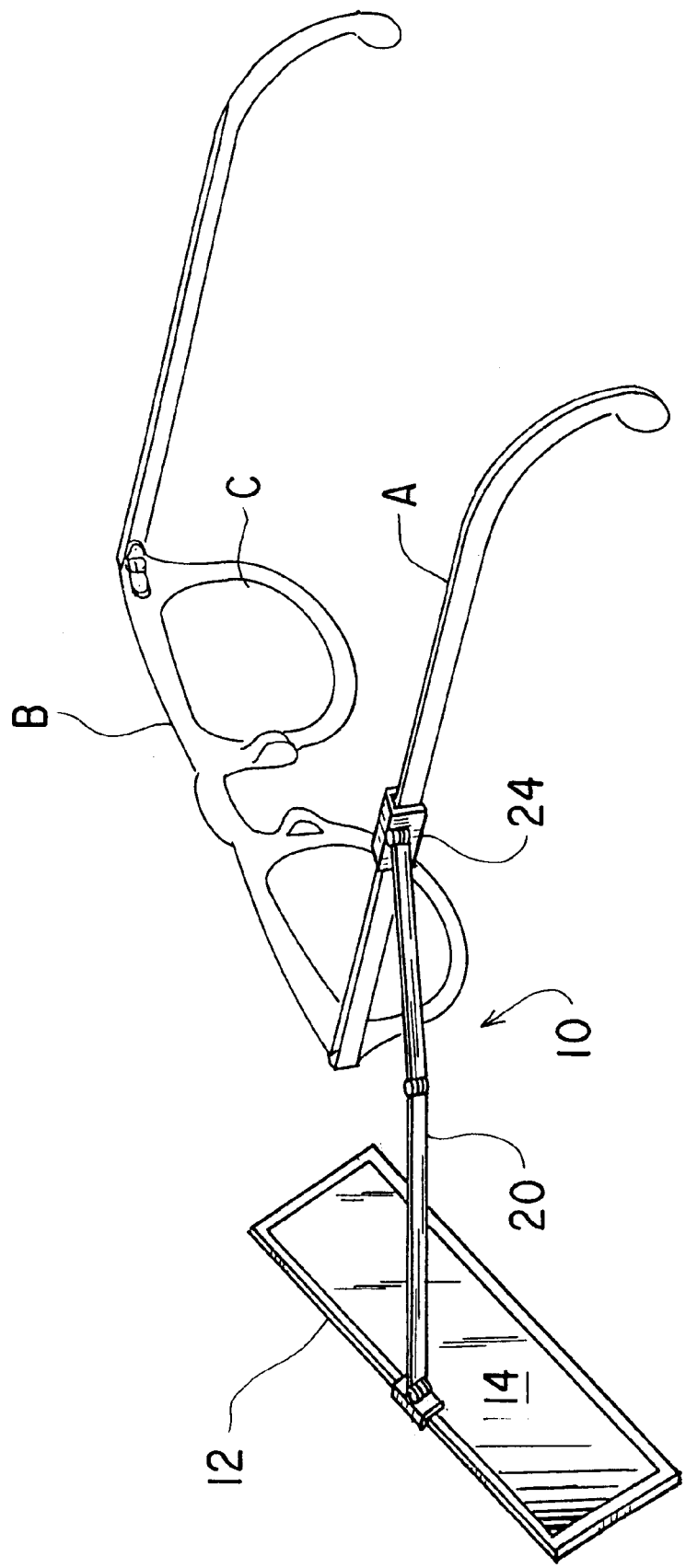
FIG. 1 is an environmental, perspective view of a mirror attachment for eyeglasses according to the present invention.

The present invention is a mirror attachment for eyeglasses, designated generally as 10 in the drawings. As shown in FIG. 1, the mirror attachment includes a lightweight, rectangular mirror 12 attached to the temple piece B of a pair of eyeglasses A by a hinged arm 20. The mirror 12 includes a reflective front surface 14 mounted on a rigid plastic frame 16 which covers the back surface 18 (FIG. 3) of the mirror 12 and extends over the front, bottom, and side edges of the front surface 14 of the mirror 12. The frame may be made from polyethylene of polypropylene. The reflective surface 14 may be any lightweight surface reflecting visible light conventionally known in the art, such as a thin film of polished aluminum on a Mylar™ backing. The mirror 12 may have any appropriate dimensions, and may have either a plane, concave, or convex surface. In the preferred embodiment, the mirror 12 is rectangular and measures about five inches long by two inches wide. The hinged arm 20 may be made from a lightweight plastic or from aluminum, and is preferably about five inches long when extended, being substantially rectangular in cross section, the rectangle being about 3 mm long and between about 1 mm and 3 mm wide.

Figure 2:
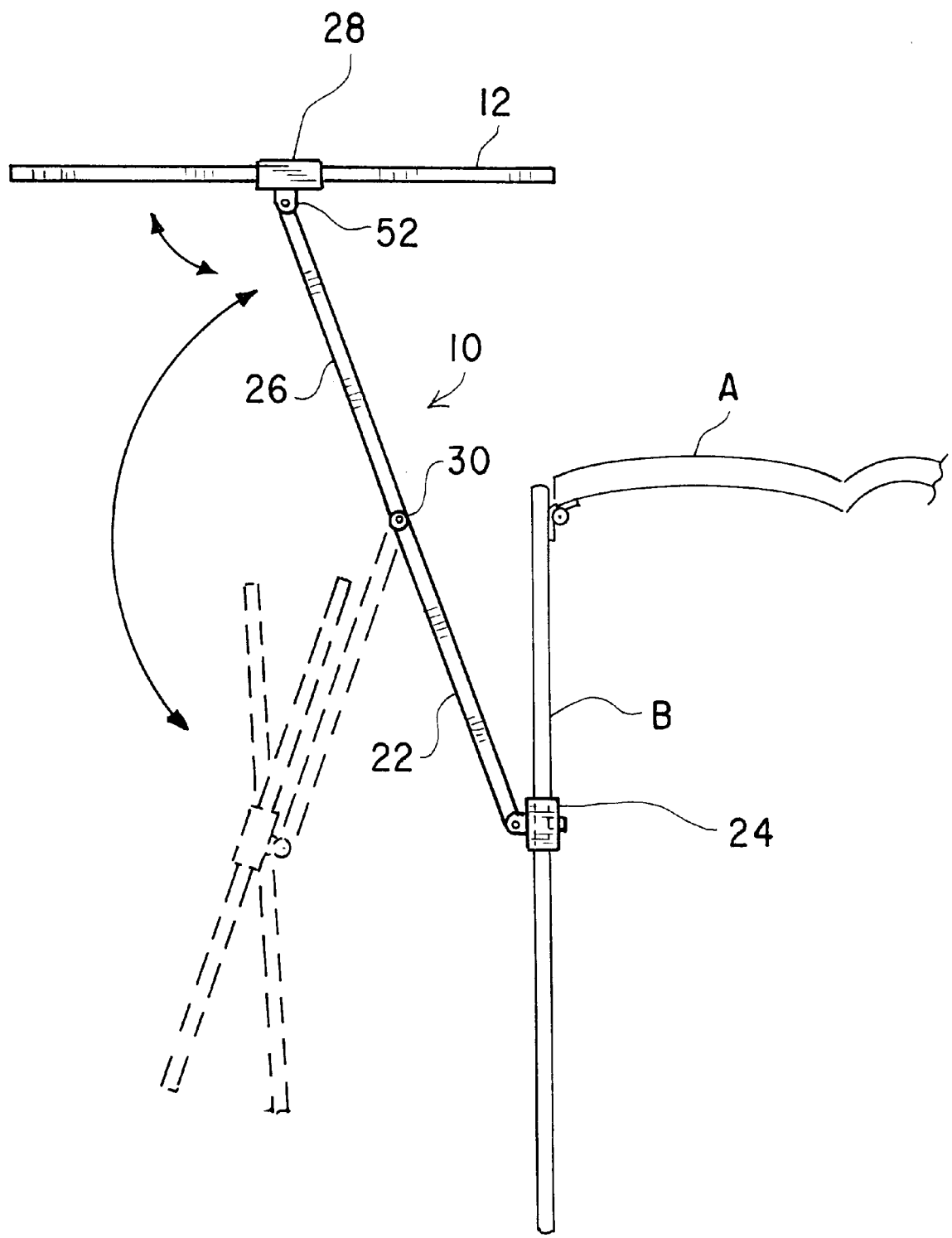
FIG. 2 is a plan view of a mirror attachment for eyeglasses according to the present invention with the mirror extended.
Figure 3:
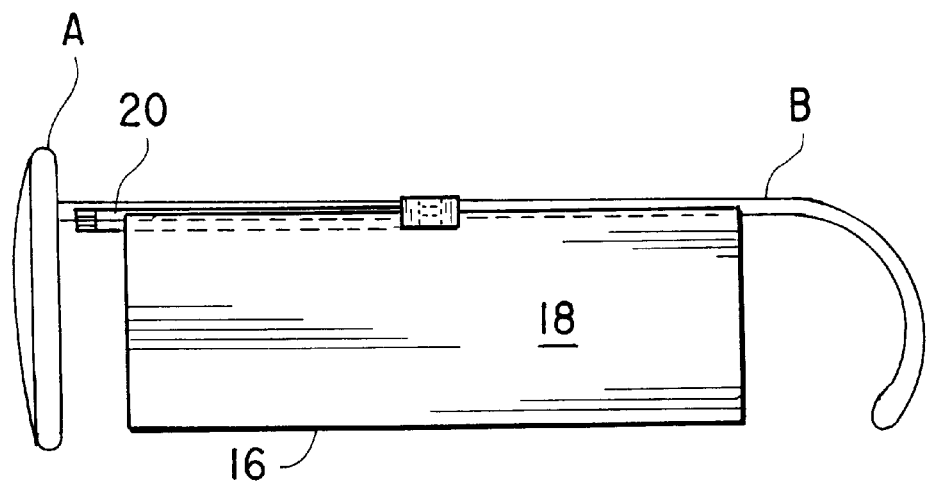
FIG. 3 is a side elevational view of a mirror attachment for eyeglasses according to the present invention with the mirror folded in a closed position.
Figure 4:
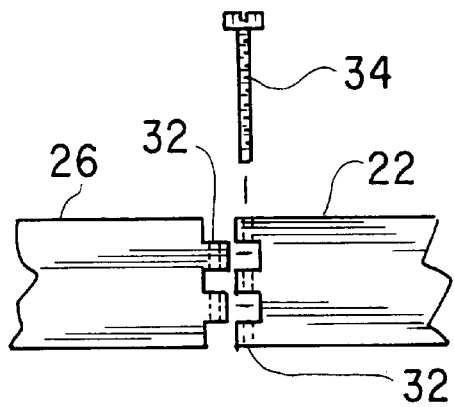
FIG. 4 is an exploded view of the hinge between the proximal and distal portions of the hinged arm.

The mirror 12 has an open position in which the mirror 12 extends to a vertical plane parallel to and anterior to the plane of the eyeglass lenses C with the reflective front surface disposed posteriorly when in use, and folds to a closed position generally parallel to the temple piece B when not in use, as shown in FIGS. 2 and 3. The hinged arm 20 includes a proximal portion 22 attached to the temple piece B by a U-shaped clip 24, and a distal portion 26 attached to the mirror 12 by a similar U-shaped clip 28. The proximal 22 and distal 26 portions of the hinged arm 20 are articulated by a knuckle joint hinge 30. As shown more particularly in FIG. 4, the proximal 22 and distal 26 portions have flat projections 32 extending from an end of the portions with an eye defined therein, the projections 32 interlocking and a threaded pin 34 being inserted through the aligned eyes, the proximal and distal portions being rotatable about the joint 30, but the projections 32 engaging each other closely enough so that friction holds the proximal 22 and distal 26 portions in relatively fixed angular relation, restricting free rotation.

Figure 5:
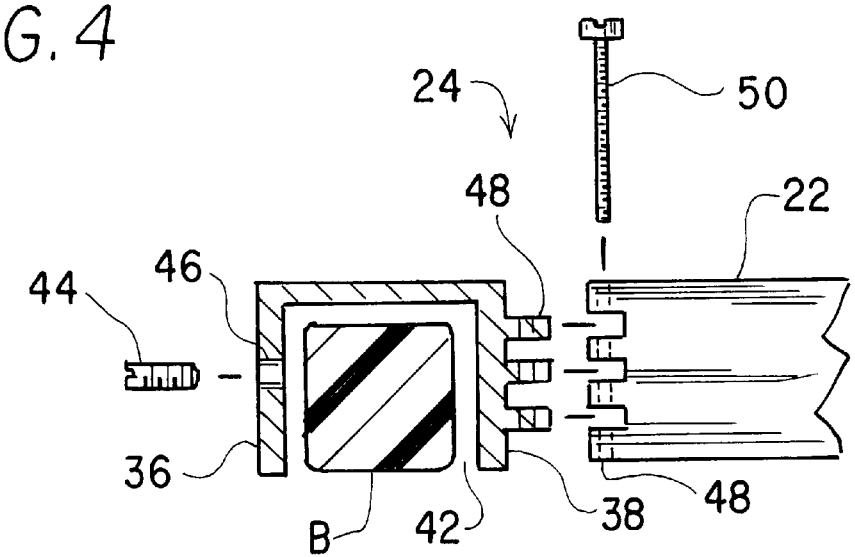
FIG. 5 is a exploded, front view, partly in section, of the U-shaped clip attaching the hinged arm to the temple piece.

The U-shaped clip 24 attaching the proximal portion 22 to the temple piece B is shown more particularly in FIG. 5. It will be understood that the U-shaped clip 28 attaching the distal portion 26 to the mirror 12 is similar in structure to U-shaped clip 24, varying in dimension. The U-shaped clip 24 includes a first vertical side wall 36, a second vertical side wall 38, and a horizontal connecting wall 40 disposed between the vertical side walls 36, 38 defining a recess 42. The clip 24 is placed on the temple piece B, the recess 42 opening vertically downwards and the side walls 36, 38 closely engaging the temple piece B. The clip 24 is clamped to the temple piece B by a set screw 44, preferably having an Allen head, threadably inserted through an aperture 46 in the first vertical side wall 36 in order to compress the temple piece B against the opposing side wall 38.

The proximal portion 22 of the hinged arm 20 is attached to the clip 24 by a knuckle joint hinge. The second vertical side wall 38 has a plurality of flat projections 48 having eyes defined therein which interlock with flat projections 48 having eyes defined therein at an end of the proximal portion 24, a threaded pin 50 being inserted through the aligned eyes, the knuckle joint permitting rotation but friction between the projections restricting free rotation. The U-shaped clip 28 has similar construction, the clip 28 being placed so that the recess 42 engaged the top edge of the mirror 12, the set screw 44 engaging the back surface 18 of the mirror and the distal portion 26 of the hinged arm 20 being attached to the clip 28 by a knuckle joint hinge 52 on the front surface 14 side of the clip 28. The position of the clips 24, 28 are adjusted so that the mirror 12 extends into a vertical plane anterior to the vertical plane of the lenses C, preferably by about two inches.

Figure 6:
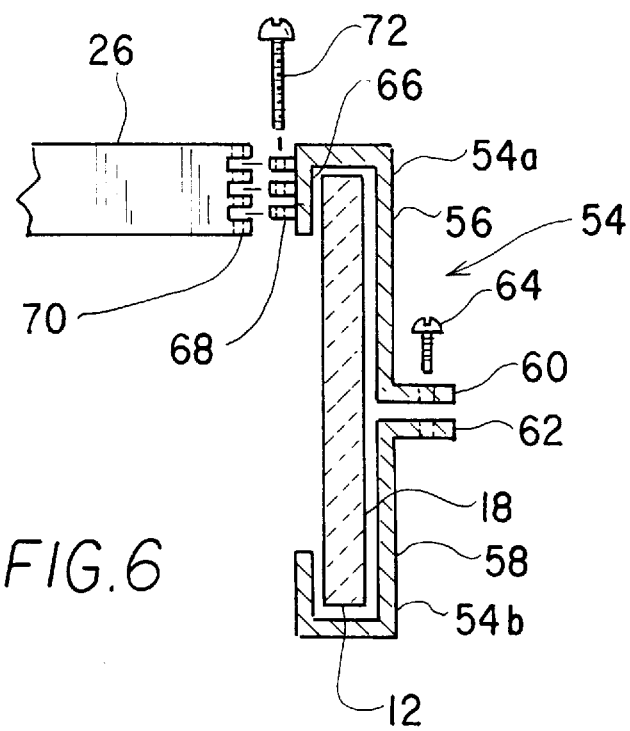
FIG. 6 is an exploded, side view, partly in section, of an alternative embodiment of a clip attaching the hinged arm to the mirror.

An alternative embodiment of a C-shaped clip 54 for attaching the distal portion 26 of the hinged arm 20 to the mirror 12 is shown in FIG. 6. The clip 54 includes generally U-shaped top 54a and bottom 54b sections having rear vertical side walls 56 and 58 each extending about one-half the width of the mirror 12, the ends of the side walls 56, 58 being bent at 90° angles to form flanges 60 62 which are joined by a screw 64 behind the rear surface 18 of the mirror 12. The front vertical side wall 66 of the top section of the clip 54 has a plurality of flat projections 68 having eyes defined therein interlocking with flat projections 70 from an end of the distal portion 26, a threaded pin 72 being inserted through aligned eyes in the projections 70, 72 to form knuckle joint hinge 52.

It will be obvious to those skilled in the art that although the hinge 30 articulating the proximal 22 and distal 26 portions of the hinged arm 20 is shown in FIG. 2 folding with the knuckle joint 30 moving anteriorly, the mirror attachment 10 may also be constructed so that the knuckle joint 30 moves posteriorly as the arm 20 is folded to the closed position. It will also be obvious to those skilled in the art that although the mirror attachment 10 is shown attached to the left temple piece B in the drawings, the mirror attachment 10 may be attached to the right temple piece only, or a pair of mirror attachments 10 may be attached to both temple pieces bilaterally.

Figure 7:
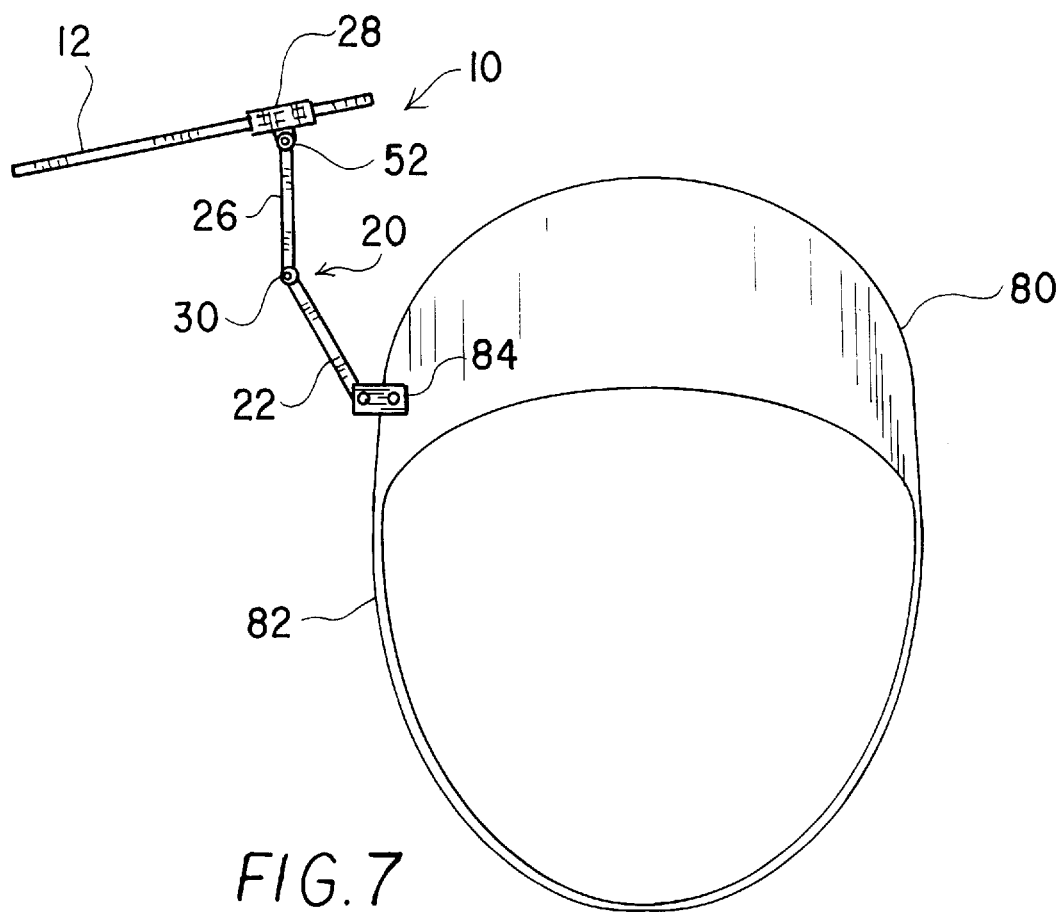
FIG. 7 shows an alternative embodiment of the mirror attachment for use with a visor or cap brim.
Figure 8:
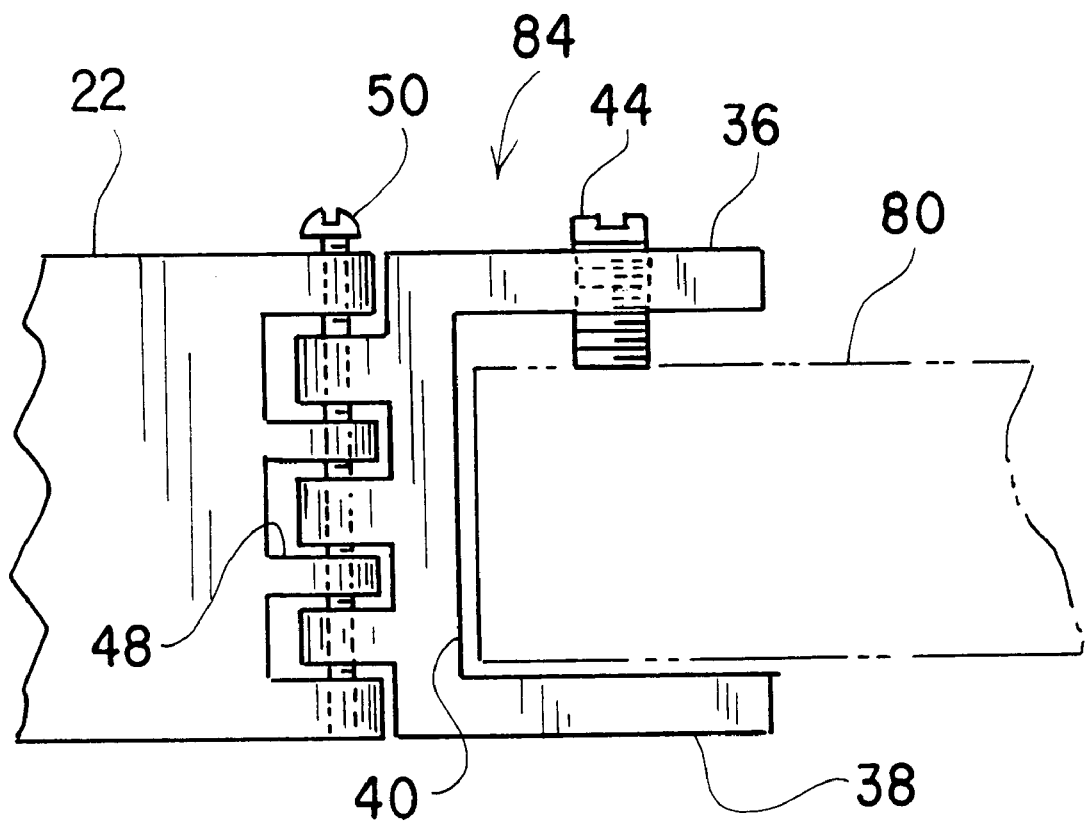
FIG. 8 shows a detail of the clip attaching the mirror attachment to a visor.

An alternative embodiment of the mirror attachment for attachment to a sun visor or the brim of a cap is shown in FIG. 7. FIG. 7 shows a plastic visor 80 with an elastic headband 82 which may itself be worn under a cap as a support for the mirror attachment. Construction of the mirror attachment 10 is exactly the same as the embodiment for attachment to eyeglasses, except that the clip 84 securing the proximal portion 22 of the hinged arm 20 to the visor 80 has the projections 48 forming part of the knuckle joint extending from the connecting wall 40 instead of side wall 38, as shown in FIG. 8.

It is to be understood that the present invention is not limited to the embodiments described above, but encompasses any and all embodiments within the scope of the following claims.

I claim:

1. A mirror attachment for eyeglasses adapted for providing the wearer with a view of the area to the rear, comprising:
    a) a hinged arm having a proximal portion and a distal portion, the proximal and distal portions being articulated by a hinged joint, the hinged point having a vertically oriented hinge pin;
    b) a mirror having a reflective surface;
    c) pivoting mirror attachment means for pivotally attaching said mirror to the distal portion of said hinged arm;
    d) pivoting temple piece attachment means for pivotally attaching the proximal portion of said hinged arm to a temple piece of a pair of eyeglasses; and
    e) said mirror having an open position in which said mirror extends to a vertical plane anterior to a vertical plane in which the lenses of the eyeglasses are disposed, the reflective surface being disposed posteriorly, and a closed position in which said mirror is parallel to the temple piece of the eyeglasses.

2. The mirror attachment for eyeglasses according to claim 1, wherein the proximal and distal portions of said hinged arm are made from aluminum.

3. The mirror attachment for eyeglasses according to claim 1, wherein the proximal and distal portions of said hinged arm are made from light weight plastic.

4. The mirror attachment for eyeglasses according to claim 1, wherein said mirror comprises a reflective surface mounted on a rigid plastic frame, the mirror being rectangular in shape and having a front surface, a rear surface, a top edge, a bottom edge and side edges, the plastic frame covering the rear surface and extending over the top, bottom and side edges of said mirror.

5. The mirror attachment for eyeglasses according to claim 1, wherein the reflective surface of said mirror comprises a thin film of polished aluminum deposed on a lightweight backing.

6. The mirror attachment for eyeglasses according to claim 1, wherein the reflective surface of said mirror is a plane surface.

7. The mirror attachment for eyeglasses according to claim 1, wherein the reflective surface of said mirror is a concave surface.

8. The mirror attachment for eyeglasses according to claim 1, wherein the reflective surface of said mirror is a convex surface.

9. The mirror attachment for eyeglasses according to claim 1, wherein said pivoting temple piece attachment means comprises:
    a) a U-shaped clip having a first side wall, an opposing second side wall, and a connecting wall defining a recess, said first wall having a threaded aperture defined therein and said second wall having a plurality of flat projections extending therefrom, each projection having an eye defined therein;
    b) a set screw threadably engaging the threaded aperture defined in said first side wall, the temple piece of the eyeglasses being disposed within the recess defined in said U-shaped clip, the set screw clamping the temple piece against said opposing second side wall;
    c) a plurality of flat projections extending from an end of the proximal portion of said hinged arm, each projection having an eye defined therein; and
    d) a threaded pin, the pin being inserted through the interlocking projections of said U-shaped clip and the proximal portion of said hinged arm, the eyes defined therein being aligned, in order to form a knuckle joint hinge.

10. The mirror attachment for eyeglasses according to claim 1, wherein said pivoting mirror attachment means comprises:
    a) a U-shaped clip having a first side wall, an opposing second side wall, and a connecting wall defining a recess, said first wall having a threaded aperture defined therein and said second wall having a plurality of flat projections extending therefrom, each projection having an eye defined therein;
    b) a set screw threadably engaging the threaded aperture defined in said first side wall, a portion of a top edge of said mirror being disposed within the recess defined in said U-shaped clip, the set screw clamping the mirror against said opposing second side wall;
    c) a plurality of flat projections extending from an end of the distal portion of said hinged arm, each projection having an eye defined therein; and
    d) a threaded pin, the pin being inserted through the interlocking projections of said U-shaped clip and the distal portion of said hinged arm, the eyes defined therein being aligned, in order to form a knuckle joint hinge.

11. The mirror attachment for eyeglasses according to claim 1, wherein said pivoting mirror attachment means comprises:
    a) a C-shaped clip having a U-shaped top section and a U-shaped bottom section, the top and bottom sections being adjustably joined by a screw, said mirror being disposed within said C-shaped clip, the top section having a plurality of flat projections extending therefrom, each projection having an eye defined therein;
    b) a plurality of flat projections extending from an end of the distal portion of said hinged arm, each projection having an eye defined therein; and
    c) a threaded pin, the pin being inserted through the interlocking projections of said C-shaped clip and the distal portion of said hinged arm, the eyes defined therein being aligned, in order to form a knuckle joint hinge.

12. A mirror attachment adapted for attachment to the brim of a cap for providing the wearer with a view of the area to the rear, comprising:
   a) a hinged arm having a proximal portion and a distal portion, the proximal and distal portions being articulated by a hinged joint;
   b) a mirror having a reflective surface;
   c) pivoting mirror attachment means for pivotally attaching said mirror to the distal portion of said hinged arm;
   d) pivoting brim attachment means for pivotally attaching the proximal portion of said hinged arm to a brim of a cap; and
   e) said mirror having an open position in which said mirror extends to a vertical plane anterior to a vertical plane to the plane in which the eyes of a wearer of the cap are disposed, the reflective surface being disposed posteriorly, and a closed position in which said mirror is parallel to the temple of the wearer of the cap.

13. A mirror attachment adapted for attachment to the brim of a cap according to claim 12, wherein said pivoting brim attachment means comprises:
   a) a U-shaped clip having a first side wall, an opposing second side wall, and a connecting wall defining a recess, said first wall having a threaded aperture defined therein and said connecting wall having a plurality of flat projections extending therefrom, each projection having an eye defined therein;
   b) a set screw threadably engaging the threaded aperture defined in said first side wall, the brim of the cap being disposed within the recess defined in said U-shaped clip, the set screw clamping the brim against said opposing second side wall;
   c) a plurality of flat projections extending from an end of the proximal portion of said hinged arm, each projection having an eye defined therein; and
   d) a threaded pin, the pin being inserted through the interlocking projections of said U-shaped clip and the proximal portion of said hinged arm, the eyes defined therein being aligned, in order to form a knuckle joint hinge.

14. The mirror attachment adapted for attachment to the brim of a cap according to claim 12, wherein said pivoting mirror attachment means comprises:
   a) a U-shaped clip having a first side wall, an opposing second side wall, and a connecting wall defining a recess, said first wall having a threaded aperture defined therein and said second wall having a plurality of flat projections extending therefrom, each projection having an eye defined therein;
   b) a set screw threadably engaging the threaded aperture defined in said first side wall, a portion of a top edge of said mirror being disposed within the recess defined in said U-shaped clip, the set screw clamping the mirror against said opposing second side wall;
   c) a plurality of flat projections extending from an end of the distal portion of said hinged arm, each projection having an eye defined therein; and
   d) a threaded pin, the pin being inserted through the interlocking projections of said U-shaped clip and the distal portion of said hinged arm, the eyes defined therein being aligned, in order to form a knuckle joint hinge.

15. The mirror attachment adapted for attachment to the brim of a cap according to claim 12, wherein said pivoting mirror attachment means comprises:
   a) a C-shaped clip having a U-shaped top section and a U-shaped bottom section, the top and bottom sections being adjustably joined by a screw, said mirror being disposed within said C-shaped clip, the top section having a plurality of flat projections extending therefrom, each projection having an eye defined therein;
   b) a plurality of flat projections extending from an end of the distal portion of said hinged arm, each projection having an eye defined therein; and
   c) a threaded pin, the pin being inserted through the interlocking projections of said C-shaped clip and the distal portion of said hinged arm, the eyes defined therein being aligned, in order to form a knuckle joint hinge.

16. A mirror attachment in combination with a visor adapted for being worn under a cap for providing the wearer with a view of the area to the rear, comprising:
   a) a hinged arm having a proximal portion and a distal portion, the proximal and distal portions being articulated by a hinged joint;
   b) a mirror having a reflective surface;
   c) pivoting mirror attachment means for pivotally attaching said mirror to the distal portion of said hinged arm;
   d) a visor having an elastic headband, the visor being adapted for being worn under a cap;
   e) pivoting visor attachment means for pivotally attaching the proximal portion of said hinged arm to said visor; and
   f) said mirror having an open position in which said mirror extends to a vertical plane anterior to a vertical plane to the plane in which the eyes of a wearer of the visor are disposed, the reflective surface being disposed posteriorly, and a closed position in which said mirror is parallel to the temple of the wearer of the visor.

17. The mirror attachment in combination with a visor according to claim 16, wherein said pivoting visor attachment means comprises:
   a) a U-shaped clip having a first side wall, an opposing second side wall, and a connecting wall defining a recess, said first wall having a threaded aperture defined therein and said connecting wall having a plurality of flat projections extending therefrom, each projection having an eye defined therein;
   b) a set screw threadably engaging the threaded aperture defined in said first side wall, the visor being disposed within the recess defined in said U-shaped clip, the set screw clamping the visor against said opposing second side wall;
   c) a plurality of flat projections extending from an end of the proximal portion of said hinged arm, each projection having an eye defined therein; and
   d) a threaded pin, the pin being inserted through the interlocking projections of said U-shaped clip and the proximal portion of said hinged arm, the eyes defined therein being aligned, in order to form a knuckle joint hinge.

18. The mirror attachment in combination with a visor according to claim 16, wherein said pivoting mirror attachment means comprises:
   a) a U-shaped clip having a first side wall, an opposing second side wall, and a connecting wall defining a recess, said first wall having a threaded aperture defined therein and said second wall having a plurality of flat projections extending therefrom, each projection having an eye defined therein;

b) a set screw threadably engaging the threaded aperture defined in said first side wall, a portion of a top edge of said mirror being disposed within the recess defined in said U-shaped clip, the set screw clamping the mirror against said opposing second side wall;

c) a plurality of flat projections extending from an end of the distal portion of said hinged arm, each projection having an eye defined therein; and d) a threaded pin, the pin being inserted through the interlocking projections of said U-shaped clip and the distal portion of said hinged arm, the eyes defined therein being aligned, in order to form a knuckle joint hinge.

19. The mirror attachment in combination with a visor according to claim 16, wherein said pivoting mirror attachment means comprises:

a) a C-shaped clip having a U-shaped top section and a U-shaped bottom section, the top and bottom sections being adjustably joined by a screw, said mirror being disposed within said C-shaped clip, the top section having a plurality of flat projections extending therefrom, each projection having an eye defined therein;

b) a plurality of flat projections extending from an end of the distal portion of said hinged arm, each projection having an eye defined therein; and c) a threaded pin, the pin being inserted through the interlocking projections of said C-shaped clip and the distal portion of said hinged arm, the eyes defined therein being aligned, in order to form a knuckle joint hinge.

* * * * *